United States Patent [19]
Monteith

[11] Patent Number: 5,746,912
[45] Date of Patent: May 5, 1998

[54] MULTICELL SEPARATOR

[75] Inventor: Joseph Gordon Monteith, Etobicoke, Canada

[73] Assignee: Stormceptor Canada Inc., Ontario, Canada

[21] Appl. No.: 811,510

[22] Filed: Mar. 4, 1997

[30] Foreign Application Priority Data

Jan. 23, 1997 [CA] Canada ................................. 2195822

[51] Int. Cl.$^6$ ................................................. B01D 21/02
[52] U.S. Cl. ........................... 210/170; 210/519; 210/521; 210/532.1; 210/539
[58] Field of Search ................................. 210/170, 519, 210/521, 532.1, 532.2, 538, 539

[56] References Cited

U.S. PATENT DOCUMENTS

| | | |
|---|---|---|
| 942,907 | 12/1909 | Huff . |
| 1,102,463 | 7/1914 | Wyckoff ................................. 210/519 |
| 1,677,626 | 7/1928 | Frappy ................................. 210/532.2 |
| 1,715,466 | 6/1929 | Miller ................................. 210/532.2 |
| 1,844,443 | 3/1932 | Schmidt . |
| 2,068,140 | 1/1937 | Jaquith ................................. 210/532.2 |
| 3,221,881 | 12/1965 | Weiler et al. . |
| 3,567,024 | 3/1971 | McCormick . |
| 4,136,010 | 1/1979 | Pilie et al. . |
| 4,308,136 | 12/1981 | Warne, Jr. ................................. 210/519 |
| 5,061,369 | 10/1991 | Romero et al. ................................. 210/521 |
| 5,204,000 | 4/1993 | Steadman et al. ................................. 210/519 |

Primary Examiner—Christopher Upton
Attorney, Agent, or Firm—Shoemaker & Mattare, Ltd.

[57] ABSTRACT

A wastewater treatment installation includes at least two tank units having portions located in juxtaposed relation, the units being secured in such position. An inlet to the first tank unit communicates with a drop pipe connecting the inlet to a liquid delivery structure intermediate the top and bottom of the first tank unit, and located diametrically opposite the respective portion. The liquid delivery structure ejects liquid tangentially in opposite directions along the side wall of the first tank unit. An outlet from the second tank unit (or the last of a series of units) is located opposite the respective portion, and an outlet riser pipe connects the outlet to an intake opening, which is located intermediate the top and bottom of the second tank unit. A transfer opening at the juxtaposed portions connects each adjacent pair of tank units, and a diversion fitting associated with the opening between the tanks ensures that most of the liquid entering the second tank unit is ejected tangentially in opposite directions along the side wall of the second tank unit. This reduces the likelihood of scouring and discharging settled materials at the bottom of the tank units, and also the ejection of floating materials (oil, grease, etc.) captured in the tank units above the general level of the lower ends of the inlet drop pipe and the outlet riser pipe.

16 Claims, 2 Drawing Sheets

MULTICELL SEPARATOR

This invention relates generally to separator tanks, sometimes called interceptors, which are adapted to receive liquid for processing (essentially the removal of undesirable components), before being passed along to municipal sewers and the like.

BACKGROUND OF THIS INVENTION

Recently, many kinds of separator tanks or interceptors have been placed on the market and are the subject of patent applications or issued patents. Some such separator tanks are adapted primarily for rain water from a storm sewer or drain. Others are more suitable for treating wastewater containing free oil and grease, food waste and other floatables, and settleable solids from restaurants, kitchens, service garages, grocery stores, and food processing operations.

The present invention relates to the latter category of interceptor.

A survey of the prior art has revealed the following patents, representing the background against which the present invention was developed.

U.S. Pat. No. 4,136,010, Pilie, Jan. 23, 1979
U.S. Pat. No. 1,844,443, Schmidt, Feb. 9, 1932;
U.S. Pat. No. 942,907, Huff, Dec. 14, 1909;
U.S. Pat. No. 3,567,024, McCormick, Mar. 2, 1971;
U.S. Pat. No. 3,221,881 Weiler et al, Dec. 7, 1965.

GENERAL DESCRIPTION OF THIS INVENTION

In essence, the separator tank described herein consists of a plurality (usually two) of cylindrical tank units juxtaposed against one another with an opening between them for the transfer of liquid.

Materials to be processed enter the first tank unit through an inlet and are discharged tangentially along the curved inner wall of the first tank unit, with the two streams converging at the opening which communicates the tank units. At the opening, there is a particular structure which redirects liquid flow tangentially around the inner wall of the second tank unit and eventually to an outlet. By providing a submerged inlet drop pipe connected to the inlet and a submerged outlet riser pipe connected to the outlet, provision is made for storing oil, grease, solids and other floatables. Controlled tangential flow of the liquid entering the first tank unit ensures that the previously captured materials are not scoured out or resuspended. The two tank units may be separately constructed, taken individually to the site, and installed. This avoids problems relating to the transportation and manipulation of large, heavy units which are assembled in completed form prior to transportation.

The separator design to be described herein is particularly applicable for construction from materials that are non-porous, non-corrosive and chemically inert to most wastes. By carefully selecting the materials to be used, attack from food and petrochemical wastewaters can be avoided. This ensures reduced potential for on-site soil contamination around the interceptor.

Essentially, the interceptor described herein can protect municipal sanitary sewers from unwanted contaminants entering and causing blockages in the sewer lines.

By virtue of removing free oil and grease, food waste and other floatables, as well as sediment and suspended solids that are insoluble in water, the interceptor described herein is effective in treating wastewaters from such sources as restaurants, kitchens (hospitals, schools, nursing homes, etc.), grocery stores, and food processing operations such as bakeries and meat/poultry processing. The interceptor described herein is also effective in treating process wastewaters from maintenance garages, service stations, bus depots, car washes, machine shops and various industrial operations.

The particular shape of the units used to construct the interceptor allows the units to withstand the pressures encountered in below-grade installation. The interceptor may also be installed above grade.

Although the interceptor is suited for both indoor and outdoor installations, the necessity for ensuring accessibility for maintenance purposes may limit indoor applications. Also, since odours escape during maintenance periods, there are certain situations (such as restaurants) where the interceptor should be installed outdoors, in order to avoid offending patrons.

More particularly, this invention provides a wastewater treatment and storage installation comprising:
   at least two tank units, each unit including a bottom wall and a side wall, each side wall exhibiting an inner surface which is substantially curvilinear over a substantial portion thereof; the tank units being disposed in serial, side-by-side relation such that each unit has at least one portion that is contiguous with an adjacent unit;
   an inlet opening through the side wall of an end one of said tank units, positioned adjacent the top thereof and generally opposite said portion of said end unit;
   an outlet opening through the side wall of the opposite end one of said tank units, positioned adjacent the top thereof and generally opposite said portion of said opposite end unit;
   an inlet drop pipe connected to the inlet opening and extending downward therefrom inside the first end tank unit to a delivery structure located adjacent the side wall thereof at an intermediate position between the top and bottom of the unit, said delivery structure ensuring that at least some of the liquid entering the first end tank unit from the inlet drop pipe is directed tangentially in opposite directions along the side wall of the first end tank unit;
   an outlet riser pipe connected to the outlet opening and extending downward therefrom inside said opposite end unit to an intake opening located generally adjacent the side wall thereof at an intermediate position between the top and bottom of said opposite end unit;
   a transfer opening between each adjacent pair of tank units, located at said portions of the tank units and at an intermediate position between the top and bottom of the tank units, the transfer opening communicating the interiors of the two adjacent tank units; and
   diversion means operatively associated with each transfer opening and ensuring that at least some of the liquid entering a tank unit through a transfer opening is ejected tangentially in opposite directions along the side wall of the respective tank unit;
   thereby reducing the likelihood of the resuspension of settled materials in the tank units, and the scouring and discharge of floating materials captured in the tank units above the general level of the lower ends of the inlet drop pipe and the outlet riser pipe.

GENERAL DESCRIPTION OF THE DRAWINGS

One embodiment of this invention is illustrated in the accompanying drawings, in which like numerals denote like parts throughout the several views, and in which.

DETAILED DESCRIPTION OF THE DRAWINGS

Figure 1:
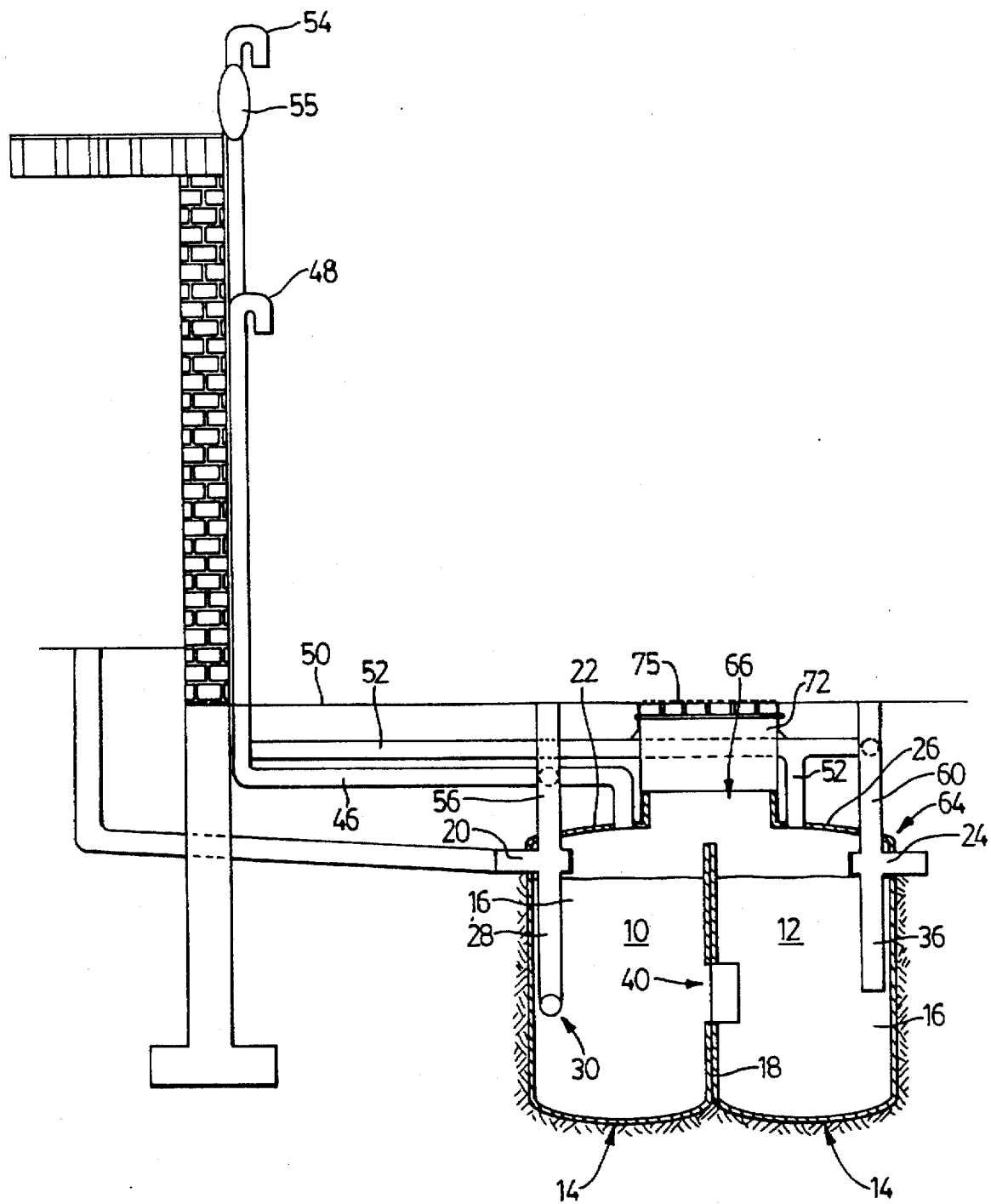
FIG. 1 is a partly broken-away elevational view of an interceptor constructed in accordance with this invention, illustrating some features of the installation site, and the main components of the interceptor itself.

FIG. 1 shows, in elevation, a first tank unit 10 and a second tank unit 12. Each tank unit includes a bottom wall 14 and a substantially cylindrical side wall 16. The cylindricality of the side walls 16 is not an essential feature, although it will be seen from what follows that each side wall 16 should include an inner surface which is substantially curvilinear over a substantial portion thereof, in order to promote laminar or "smooth" flow against the inner surface. This will be dealt with later. As pictured, the two tank units 10 and 12 are disposed in side-by-side relation, and each unit 10, 12 has a portion 18 that is contiguous with the other unit. The two tank units 10 and 12 may be adhered together at the juxtaposed portions 18, utilizing a suitable adhesive material.

An inlet opening 20 is provided through the side wall 16 of the first tank unit 10, positioned adjacent the top 22 thereof and generally opposite the portion 18 of the first tank unit 10.

An outlet opening 24 is provided through the side wall of the second tank unit 12, positioned adjacent the top 26 thereof and generally opposite the portion 18 of the second tank unit 12.

Having now introduced both the bottom wall and the top wall 22, 26 of the tank units, it is appropriate to point out that, in the preferred embodiment, the bottom walls 14 are curved concave upwardly, while the top walls 22, 26 are curved concave downwardly. The curvature of the bottom walls 14 is provided primarily to promote the gathering of settled materials toward the centre, for ease of removal. The curvature of the top walls 22 and 26 is provided in to lend strength to this portion of the tank units, which is particularly needed in the case of an underground installation.

Returning to the interior of the first tank unit 10, it will be seen that an inlet drop pipe 28 is connected to the inlet opening 20, and extends downward therefrom inside the first tank unit 10 to a delivery structure 30 which is located adjacent the side wall of the tank unit 10 at an intermediate position between the top wall 22 and the bottom wall 14 of the first tank unit 10. In the preferred embodiment, the delivery structure 30 is a Tee-fitting at the bottom of the inlet drop pipe 28, the Tee-fitting including two opposed pipe arms 32 (see FIG. 2). The structure (Tee-fitting) ensures that at least some of the liquid entering the first tank unit 10 from the inlet drop pipe 28 is directed tangentially in opposite directions along the curved inside wall of the first tank unit 10. This is particularly clear from FIG. 2, where the curvate arrows 34 show the flow direction. In the preferring embodiment, substantially all of the liquid entering the first tank unit 10 travels around the paths indicated by the numeral 34.

In tank unit 12, an outlet riser pipe 36 is connected to the outlet opening 24, and extends downward therefrom inside the second tank unit 12 to an intake opening 38, preferably the open bottom end of the riser pipe itself, the opening being located generally adjacent the side wall 16 of the second tank unit 12 at an intermediate position between the top wall 26 and the bottom wall 14 of the second tank unit 12.

To permit flow of liquid from the first tank unit 10 to the second tank unit 12, there is provided a transfer opening 40, which is located at the juxtaposed portions 18 and at an intermediate vertical position between the top and bottom of the tank units 10 and 12. The transfer opening communicates the interiors of the two tank units.

Figure 2:
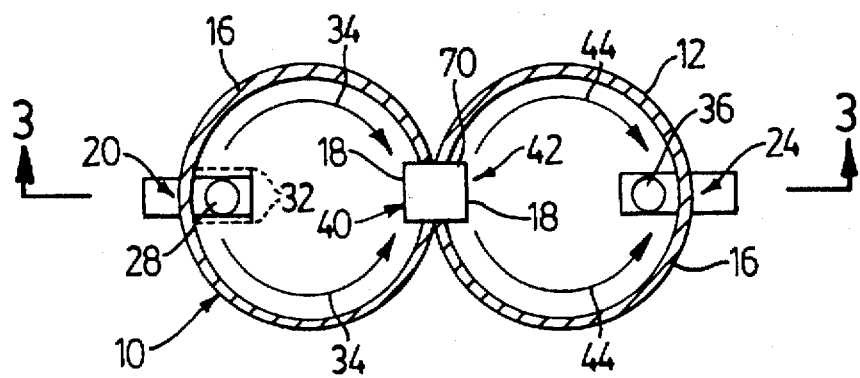
FIG. 2 is a horizontal sectional view through the interceptor, taken at the line 2—2 in FIG. 3.

A diversion means 42 is operatively associated with the transfer opening 40, and ensures that at least some of the liquid entering the second tank unit 12 through the transfer opening 40 (and preferably substantially all of it) is ejected tangentially in opposite directions along the internal side wall of the second tank unit 12. In FIG. 2, this tangential flow is represented by the arrows 44. The tangential flow represented by the arrows 34 and 44 in FIG. 2 has the effect of reducing the likelihood of the resuspension of settled materials in the tank units 10 and 12, and the scouring and discharge of floating materials captured in the tank units 10 and 12 above the general level of the lower ends of the inlet drop pipe 28 and the outlet riser pipe 36.

In a preferred embodiment, the area of the transfer opening 40 is greater than that of either the inlet opening 20 or the outlet opening 24. This provision is made to prevent restriction, and the formation of high velocities in and between the tank units 10 and 12.

Figure 3:
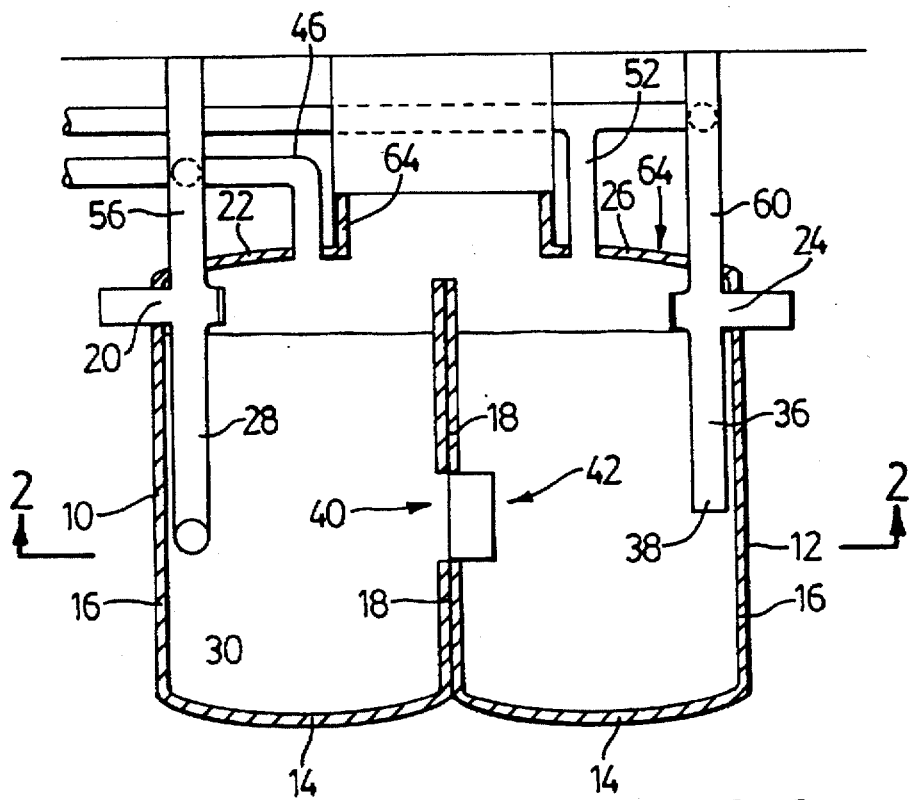
FIG. 3 is a vertical sectional view through the interceptor, taken at the line 3—3 in FIG. 2.

Looking at FIGS. 1 and 3, the illustrated preferred embodiment includes a first air vent conduit 46 opening through the top of the first tank unit 10 and extending to a first location 48 above the finished grade 50, and a second air vent conduit 52 opening through the top of the second tank unit 12 and extending to a second location 54 above finished grade 50. The vent pipe 52 includes a turbine ventilator 55 to provide adequate ventilation to the system.

Further, a clean out line 56 connects the inlet opening 20 to finished grade and provides access to the drop pipe 28 for cleaning. A sample port line 60 connects the outlet opening 24 to finished grade and provides access for effluent sampling (for below ground installations).

In the illustrated embodiment, the apparatus further includes a unitary top member 64 which is curved convex upward and which closes and seals the tops of the both tanks units 10 and 12. The top member 64 may be shaped to provide a centrally located opening 66 for maintenance and cleaning purposes.

In its operation, process wastewater enters the tank unit 10 along a 4 inch (102 mm) or 6 inch (152 mm) inlet pipe constructed from a material approved for use as sewer pipe, for example PVC, cast iron, etc. The source of entering wastewater is typically sinks, dishwashers, and floor drains connected to an inlet sewer. During the operation, with the flow being smooth and tangentially directed within both tank units 10 and 12, separation of the various components of the wastewater begins to occur. Oil, grease and other materials with a specific gravity less than water are separated and allowed to rise to the water surface. At the same time, sediment and other materials which have a specific gravity greater than water will settle to the bottom (of each tank unit).

In a preferred embodiment, the diversion box 42 within the second tank unit 12 is open only at its horizontal ends, which are tangent to the cell wall and thus create a rectangular Tee. Looking at FIG. 3, the only openings by which liquid can enter the second tank unit 12 through the diversion box 42 are located at the opposed ends 70 of the diversion box 42 (See FIG. 2).

Returning now to FIG. 1, it will be seen that there is provided, centrally above the top member 64, an extension collar 72 (for below grade installations), the collar 72 sliding over the top of the access opening 66 to form a slip joint, the extension collar extending to the finished grade level 50. If desired, the extension collar 72 can be provided with a cast iron frame and cover 75 for traffic loading and outdoor installations, or an aluminum frame and cover for non-traffic loading and indoor installations.

While one embodiment of this invention has been illustrated in the accompanying drawings and described hereinabove, it will be evident to those skilled in the art that changes and modifications may be made therein without departing from the essence of this invention, as set forth in the appended claims.

The embodiments of the invention in which an exclusive property or privilege is claimed are defined as follows:

1. A wastewater treatment and storage installation comprising:

at least two tank units, each unit including a bottom wall and a side wall, each side wall exhibiting an inner surface which is substantially curvilinear over a substantial portion thereof; the tank units being disposed in serial, side-by-side relation such that each unit has at least one portion that is contiguous with an adjacent unit;

an inlet opening through the side wall of an end one of said tank units, positioned adjacent the top thereof and generally opposite said portion of said end unit;

an outlet opening through the side wall of the opposite end one of said tank units, positioned adjacent the top thereof and generally opposite said portion of said opposite end unit;

an inlet drop pipe connected to the inlet opening and extending downward therefrom inside the first end tank unit to a delivery structure located adjacent the side wall thereof at an intermediate position between the top and bottom of the unit, said delivery structure ensuring that at least some of the liquid entering the first end tank unit from the inlet drop pipe is directed tangentially in opposite directions along the side wall of the first end tank unit;

an outlet riser pipe connected to the outlet opening and extending downward therefrom inside said opposite end unit to an intake opening located generally adjacent the side wall thereof at an intermediate position between the top and bottom of said opposite end unit;

a transfer opening between each adjacent pair of tank units, located at said portions of the tank units and at an intermediate position between the top and bottom of the tank units, the transfer opening communicating the interiors of the two adjacent tank units; and diversion means operatively associated with each transfer opening and ensuring that at least some of the liquid entering a tank unit through a transfer opening is ejected tangentially in opposite directions along the side wall of the respective tank unit;

thereby reducing the likelihood of the resuspension of settled materials in the tank units, and the scouring and discharge of floating materials captured in the tank units above the general level of the lower ends of the inlet drop pipe and the outlet riser pipe.

2. The invention claimed in claim 1, in which said delivery structure is a Tee-fitting at the bottom of the inlet drop pipe, the Tee-fitting including two opposed pipe arms adapted to deliver liquid in opposite directions within the first tank unit.

3. The invention claimed in claim 2, in which said intake opening is the open bottom end of the riser pipe itself.

4. The invention claimed in claim 3, in which the area of each transfer opening is greater than that of either the inlet opening or the outlet opening.

5. The invention claimed in claim 4, in which said diversion means is a housing located within a downstream tank unit adjacent transfer opening, the housing receiving liquid directly from the corresponding upstream tank unit through the transfer opening, the housing defining two oppositely directed apertures within said downstream tank unit for said ejection of liquid.

6. The invention claimed in claim 5, in which the bottom wall of each tank unit is dished concave upward, thus causing captured sediment materials to tend to settle near the centre of the respective tank unit.

7. The invention claimed in claim 1, further comprising: for each tank unit, a vent conduit opening through the top of the tank unit and extending to a location above finished grade.

8. The invention claimed in claim 7, further comprising: a clean out line connecting the inlet opening to finished grade, and a sample port line connecting the outlet opening to finished grade.

9. The invention claimed in claim 8, further comprising a unitary top member closing and sealing the tops of all tank units, the top member being curved convex upward and defining a centrally located opening for maintenance and cleaning purposes.

10. The invention claimed in claim 1, in which said intake opening is the open bottom end of the riser pipe itself.

11. The invention claimed in claim 1, in which the area of each transfer opening is greater than that of either the inlet opening or the outlet opening.

12. The invention claimed in claim 1, in which said diversion means is a housing located within each tank unit which is downstream of a transfer opening, the housing receiving liquid directly from the tank unit which is upstream of the transfer opening, the housing defining two oppositely directed apertures within said downstream tank unit for said ejection of liquid.

13. The invention claimed in claim 1, in which the bottom wall of each tank unit is dished concave upward, thus causing captured sediment materials to tend to settle near the centre of the respective tank unit.

14. The invention claimed in claim 1, further comprising: for each tank unit, a vent conduit opening through the top of the tank unit and extending to a location above finished grade.

15. The invention claimed in claim 14, in which the installation is underground, and which further comprises: a clean out line connecting the inlet opening to finished grade, and a sample port line connecting the outlet opening to finished grade.

16. The invention claimed in claim 1, further comprising a unitary top member closing and sealing the tops of all tank units, the top member being curved convex upward and defining a centrally located opening for maintenance and cleaning purposes.

* * * * *